UNITED STATES PATENT OFFICE 2,468,363

METHODS FOR PREPARING ACETONITRILE

Jean Léon Maurice Fréjacques, Paris, France, assignor to Compagnie de Produits Chimiques et Electrometallurgiques Alais, Froges et Camargue, Paris, France, a society of France No Drawing. Application April 24, 1945, Serial No. 590,108. In France February 19, 1942

Section 1, Public Law 690, August 8, 1946
Patent expires February 19, 1962

4 Claims. (Cl. 260—465.3)

It is well known that, through reaction of ammonia on acetylene in presence of catalysers at atmospheric pressure and at temperatures between 300 and 500° C., it is possible to obtain mixtures of liquid products containing next to acetonitrile comparatively high proportions of pyridic bases and other impurities.

It seems that the formation of acetonitrile is due to the succession of the following reactions:

(1) Hydration of acetylene so as to form acetic aldehyde $$C_2H_2 + H_2O = CH_3-CHO$$

(2) Fixation of $NH_3$ on the acetic aldehyde so as to form an aldehydate $$CH_3CHO + NH_3 = CH_3-CHOH-NH_2$$

(3) Dehydration with formation of imine $$CH_3-CHOH-NH_2 = H_2O + CH_3-CH=NH$$

(4) Dehydrogenation of the imine with formation of the desired nitrile $$CH_3-CH=NH = H_2 + CH_3-C\equiv N$$

(5) The resultant reaction is thus $$C_2H_2 + NH_3 = H_2 + CH_3-CN$$

The reaction (2) does not require a catalyser but the reactions (1), (3) and (4) require a catalyser.

According to my invention, I obtain products containing almost exclusively acetonitrile, with yields very near the theoretical yields as calculated in accordance with the reaction formula (5) and with reaction speeds which are comparatively very high, by using compound catalysers containing an acetylene hydration catalyser of the zinc oxide type, a dehydration catalyser of the alumina type and a dehydrogenation catalyser of the chromium oxide type.

It is also of advantage for the compound catalyser to be slightly alkaline.

A catalyser of this type providing conclusive results has for instance the following composition:

| | Per cent |
|---|---|
| $Al_2O_3$ | 35 |
| ZnO | 61.85 |
| $Cr_2O_3$ | 3 |
| NaOH | 0.15 |

It is of advantage to prepare it by precipitating sodium aluminate by means of a solution of zinc nitrate and chromium nitrate rather than by precipitating the mixture of nitrates by an alkaline substance.

The washing of the precipitate is not a thorough one, so as to leave in it a little sodium nitrate which, after roasting, provides the amount of soda mentioned hereinabove. It is of advantage to heat the catalyser up to 500° C. in a current of $NH_3$ before using it.

It is preferable with a view to obtaining a high yield, to use during the synthesis an excess of $NH_3$ with reference to the acetylene. It is also useful to send simultaneously a little steam. The proportion of water to be used may be adjusted very easily by making the acetylene bubble through water kept at about 60° C. The reaction begins at about 300–350° C. It is of interest to raise then the temperature progressively up to 450–500° C. in proportion as the activity of the catalyser decreases. A good speed for the passage of the gases is of the order of 60 litres of acetylene and 65 litres of ammonia per hour and per litre of catalyser. The reaction is sufficiently exothermic for the temperature to keep at the required level without any inflow of external heat, once the reaction is initiated. At the outlet from the catalyser furnace, the raw acetonitrile is condensed by cooling and rectified as explained hereinafter. The hydrogen produced by the reaction is washed with water so as to remove the $NH_3$ and the acetonitrile carried along by it. It may, after purification, be used for the synthesis of ammonia. It may also be used for the heating of the ovens. After a certain time of operation which depends chiefly on the purity of the gases used, the catalyser is soiled and its activity is reduced. When the efficiency begins to sink, the catalyser is regenerated through the mere passage of a current of air or of air and steam at 450–500° C. It may then be used for further periods of manufacture. In order to provide as large intervals as possible between the periods of regeneration, it is of interest to purify the acetylene by means of the known processes such as, for instance, washing with a sulphochromic mixture or passing over catalytic purifying masses. It is also of advantage to end the purification with a passage over active carbon. Lastly I have found that the life of the catalyser may be considerably increased if said catalyser is distributed between two or more separate furnaces, mounted in series, the acetonitrile condensing between the furnaces. The first furnace acts somewhat as a precatalyser; at the beginning, it produces the most acetonitrile. At the end, it produces hardly any, but protects the following furnace or furnaces the duration of operation of which is thus considerably increased. The total yield of the furnaces is always near the theoretical yield and the total production between the successive regenerations of the catalyser is much higher than with the same amount of catalyser placed in a single furnace.

The nature of the walls of the furnaces plays also an important part in the duration of operation. Iron is to be entirely proscribed because it catalyses the decomposition of the gas with the formation of acetylene black. Copper produces cuprene which finishes by stopping up the apparatus. Stainless steel, quartz or ceramic ware are suitable, but aluminium is by far the most advantageous material. Its lack of mechanical resistance at the temperatures applied is not a hindrance to its use. It is sufficient to use receivers of conical shape held throughout their periphery by blocks of refractory material. The catalyser load placed inside has a tendency to urge the walls against the support and the support does not change shape.

The aqueous solution obtained as stated hereinabove during the washing of the hydrogen passing out of the apparatuses, contains the ammonia used in excess and acetonitrile carried along by vapour pressure. It is possible to recover the major part of the ammonia it contains by making the acetylene entering the furnace pass through it. The solution is then distilled so as to allow the removal of the acetonitrile which passes as an azeotrope boiling around 75° C. This azeotrope is collected with the raw acetonitrile passing out of the apparatus and the whole is rectified so as to free the product from all the impurities produced in small amounts by the secondary reactions. These impurities are constituted principally by heavy products of a pyridic nature and by $CO_2$ which, when in contact with ammonia in light excess, produces carbonate.

The formation of an azeotropic mixture with water is the reason for which it is impossible to obtain anhydrous acetonitrile through simple distillation. It is necessary to resort for instance to the known methods of separation of azeotropes. For obtaining said dehydration, I may use to advantage the method disclosed in my French patent application filed on February 19, 1942, for "Method for separating azeotropic mixtures." This method is based on the following separation phenomenon: the acetonitrile is entirely miscible with water, but when its aqueous solution is saturated with an alkaline carbonate, it separates into two layers: a lower layer which is richer in water than the azeotrope and an upper layer which is less rich. If there is used as an alkaline carbonate a carbonate which is liable to be dissociated such as ammonium carbonate, it is possible to distil the aqueous layer so as to evolve first all the carbon dioxide and the ammonia which pass at about 60° C. and then the azeotrope which passes at about 75° C. These two distillates are then recycled. When distilling the upper layer, there passes first the azeotrope which is also recycled, then the anhydrous acetonitrile which passes towards 81° C. The heavy impurities remain as tailings. The azeotropes obtained during these two distillations are collected and united with the fresh azeotrope to be dehydrated and the whole is treated with the recovered ammonia and carbon dioxide. During the condensation of the latter, the apparatuses may be stopped up due to the formation of crystals. This fact should be taken into account in the construction of the refrigerators.

A very efficient condensing means which is most suitable for this particular case consists in a horizontal cylindrical receiver provided with two rotary axes and carrying hollow blades through which a current of cold water flows and which atomise the condensed liquid inside the vapour to be cooled. This method for separating azeotropes is applicable in all cases where the azeotropic mixture may be separated by an alkaline carbonate. Its use is of particular interest in the case of acetonitrile prepared in accordance with my invention because the small amount of carbonate of ammonium which is then formed through a secondary reaction is quite sufficient for compensating the losses.

Thus it is possible to obtain anhydrous very pure acetonitrile which is perfectly colourless and does not become yellow, even after a long time.

What I claim is:

1. The method of producing acetonitrile, which comprises causing a mixture of ammonia and acetylene to pass successively through two furnaces containing a compound catalyzer comprising zinc oxide, alumina, and chromium oxide and a small amount of an alkaline substance and causing acetonitrile to condense by cooling at the outlet of each of said furnaces.

2. The method of producing acetonitrile, which comprises causing a mixture of ammonia and acetylene to pass at temperature between 300 and 500° C. successively through two furnaces containing a compound catalyzer comprising zinc oxide, alumina, and chromium oxide and a small amount of an alkaline substance and causing acetonitrile to condense by cooling at the outlet of each of said furnaces.

3. The method of producing acetonitrile, which comprises causing a mixture of ammonia and acetylene to pass successively through two furnaces containing a compound catalyzer comprising zinc oxide, alumina, and chromium oxide, and an alkaline substance the amount of which is less than 1% of the weight of the catalyzer calculated in NaOH, and causing acetonitrile to condense by cooling at the outlet of each of said furnaces.

4. The method of producing acetonitrile which comprises causing a mixture of ammonia and acetylene to pass successively through two furnaces having aluminium walls and containing a compound catalyzer comprising zinc oxide, alumina, and chromium oxide and a small amount of an alkaline substance and causing acetonitrile to condense by cooling at the outlet of each of said furnaces.

JEAN LÉON MAURICE FRÉJACQUES.

REFERENCES CITED

The following references are of record in the file of this patent:

UNITED STATES PATENTS

| Number | Name | Date |
| --- | --- | --- |
| 1,668,871 | Seanlin | May 8, 1928 |
| 1,895,086 | Porter | Jan. 24, 1933 |
| 1,936,995 | Schlecht | Nov. 28, 1933 |
| 2,206,377 | Weiss | July 2, 1940 |

FOREIGN PATENTS

| Number | Country | Date |
| --- | --- | --- |
| 237,384 | Switzerland | Sept. 1, 1945 |
| 332,258 | Great Britain | July 18, 1930 |
| 334,193 | Great Britain | Aug. 25, 1930 |
| 387,962 | Germany | Jan. 7, 1924 |
| 547,518 | Germany | Mar. 23, 1932 |
| 558,565 | Germany | Sept. 8, 1932 |